Jan. 17, 1967  B. D. SCHILTZ  3,298,550
HAYSTACK TRANSPORTING DEVICE
Original Filed April 6, 1964  4 Sheets-Sheet 1

INVENTOR.
BOYD D. SCHILTZ
BY
Merchant, Merchant & Gould
ATTORNEYS

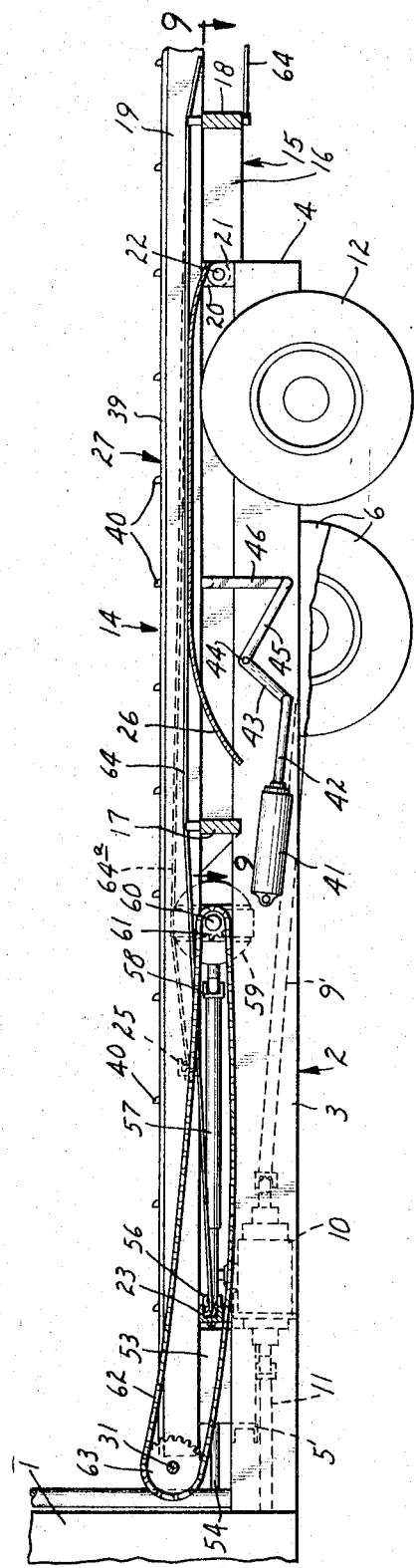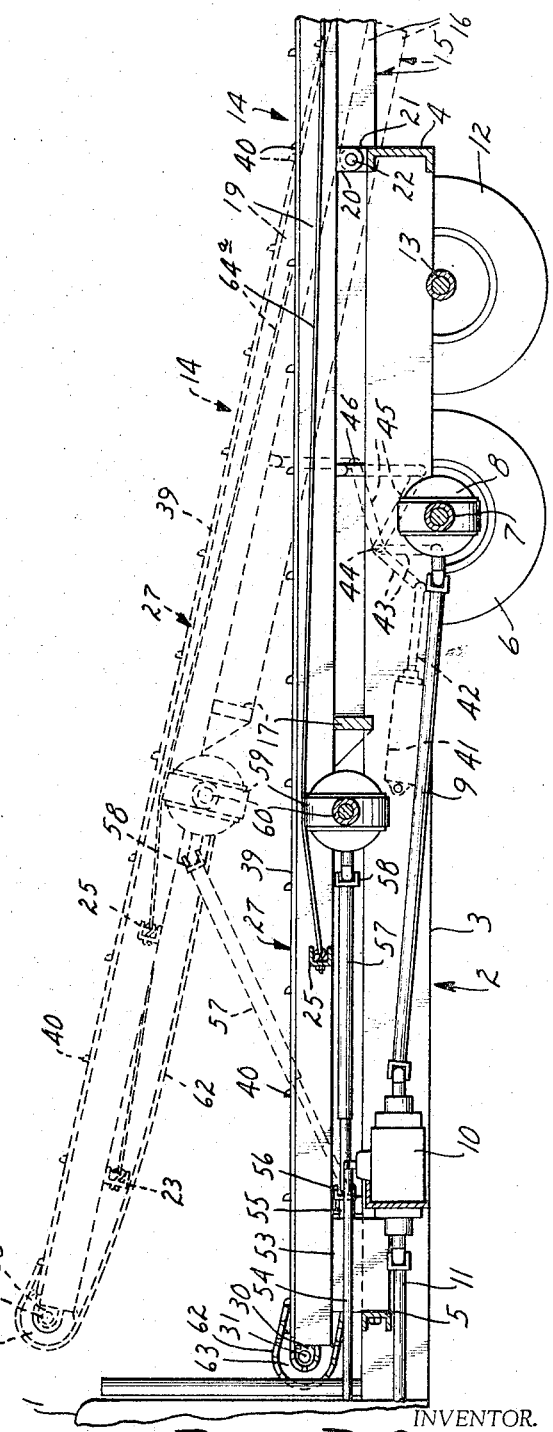

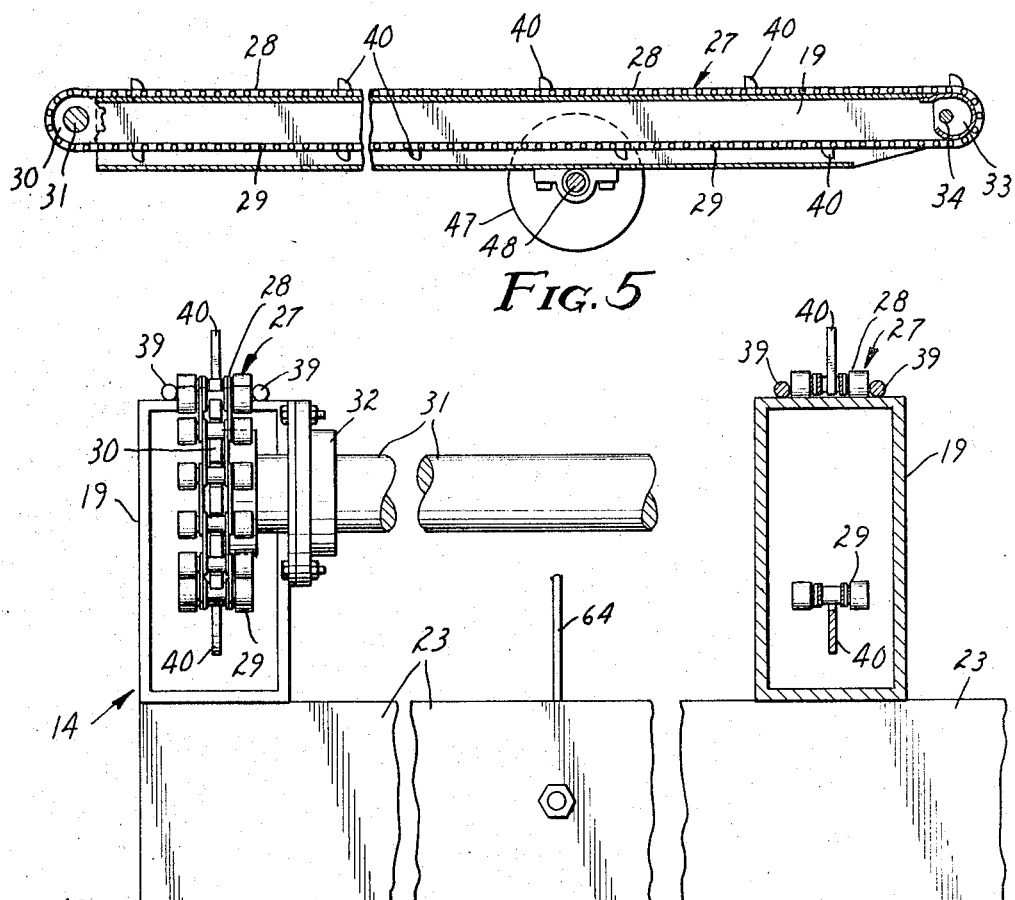
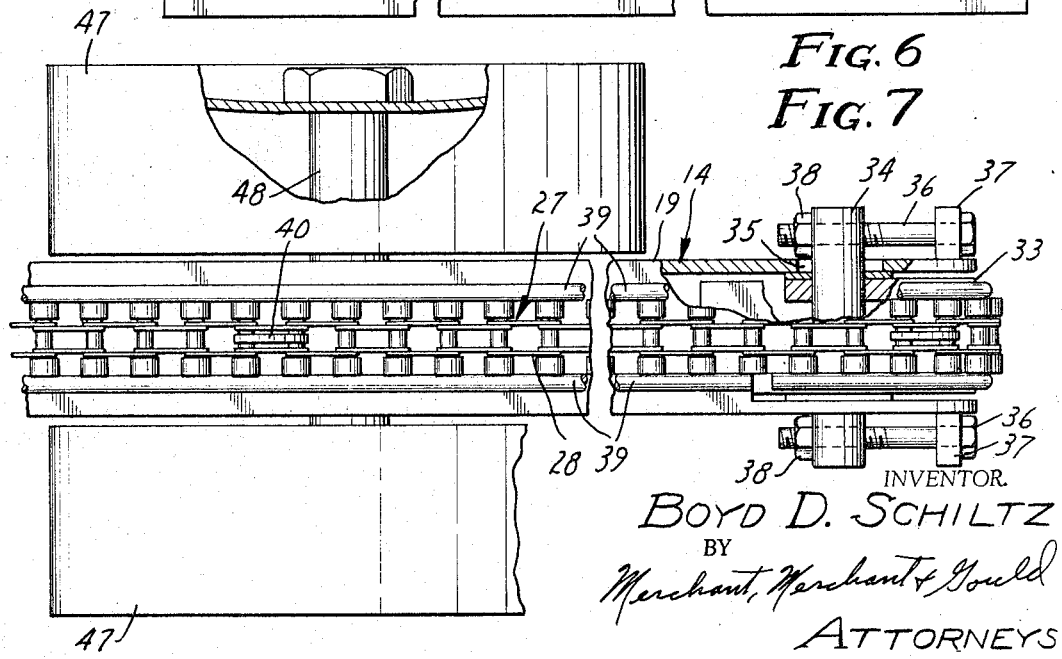
FIG. 5
FIG. 6
FIG. 7

United States Patent Office 3,298,550
Patented Jan. 17, 1967

3,298,550
HAYSTACK TRANSPORTING DEVICE
Boyd D. Schiltz, Vayland, S. Dak., assignor to Daffin Corporation, Hopkins, Minn., a corporation of Delaware
Continuation of application Ser. No. 357,433, Apr. 6, 1964. This application May 25, 1966, Ser. No. 559,657
11 Claims. (Cl. 214—505)

This application is a continuation of my co-pending United States patent application filed Apr. 6, 1964, Ser. No. 357,433 and entitled Haystack Transporting Device, now abandoned.

This invention relates generally to loading and transporting vehicles and implements, and more particularly it relates to a novel transporting device for haystacks.

While devices of the general character described herein have previously been known, the same have not produced optimum satisfaction in their operation and results; and the present invention comprehends a mobile machine for transporting haystacks which comprises an important improvement and advancement over the previously known structures, both as to the efficiency derived from the structural differences and the improved operating results and advantages. Previously known types of haystack transporting devices have normally utilized a winch device with cables for pulling the haystack onto and off of the bed or platform of the implement. Such mechanisms have not only been time consuming and laborious in their operation, but have also normally been characterized by a tendency to tear up or disarrange the stack. Further, the cables used on previous structures have been known to break under tension and therefore present a safety hazard.

With the above-noted problems and disadvantages of previously known devices in mind, an important object of the present invention is the provision of a mobile machine for transporting haystacks which eliminates the necessity for a winch and cable mechanism and provides convenient means for loading, transporting and unloading haystacks without disarrangement thereof.

Another object of the present invention is the provision of a mobile machine for transporting haystacks which includes novel means whereby the bed or supporting platform of the machine is tilted and moved in one direction, when loading, to proceed under the stack whereas the load supporting surfaces of the bed are moved in an opposite direction and at a rate generally equal to the rate of bed movement to load the stack onto the bed or platform.

Another object of the present invention is the provision of a mobile machine for transporting haystacks which is constructed to overcome the loading resistance normally encountered when attempting to load the stack onto the platform or bed assembly.

Another object of the present invention is the provision of a mobile machine for transporting haystacks which includes a tiltable bed assembly provided with a plurality of coaxially disposed rotary wheels carried by the rear end portion of the bed assembly for supporting the same when in its inclined position for movement under the haystack to be loaded.

Another object of the present invention is the provision of a mobile machine for transporting haystacks which is designed and constructed for simplicity of operation, and which is particularly designed for operation by one person.

The above and still further objects and advantages of the present invention will become apparent from a consideration of the following detailed specification, attached claims and appended drawings.

Referring to the drawings, wherein like reference characters indicate like parts or elements throughout the several views:

FIG. 3 is an enlarged view in section taken approximately on the line 3—3 of FIG. 2;

FIG. 4 is an enlarged view in section taken approximately on the line 4—4 of FIG. 2, with alternative positions of some parts being represented by dotted lines;

FIG. 5 is an enlarged view in section taken on the line 5—5 of FIG. 2, some parts being broken away;

FIG. 6 is an enlarged view in section taken approximately on the line 6—6 of FIG. 2, some parts being broken away;

FIG. 7 is an enlarged partial plan view as seen from the line 7—7 of FIG. 1, some parts being broken away;

Figure 1:
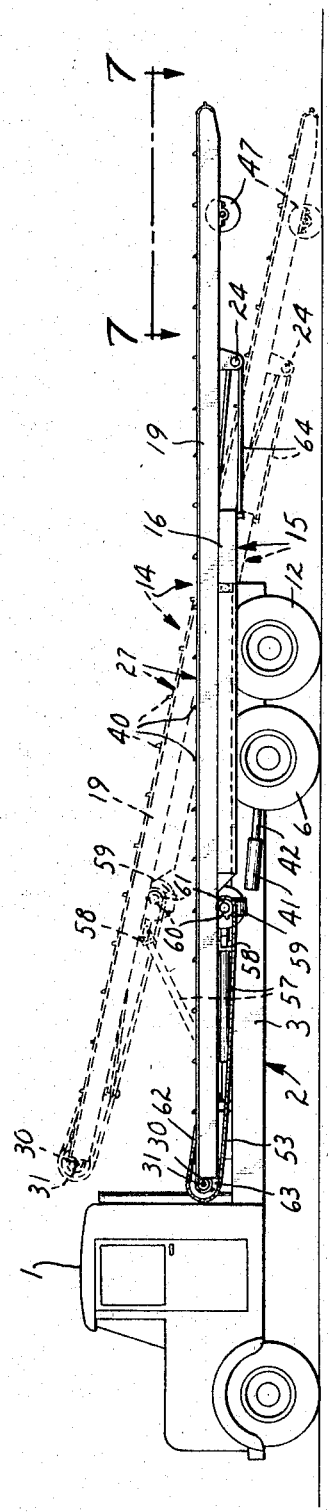
FIG. 1 is a view in side elevation showing the novel machine of the present invention, with alternative positions of some parts being shown in dotted lines.

Referring to the drawings, and particularly FIGS. 1-4 thereof, the haystack transporting machine of the present invention is mounted on a long bed truck. The truck cab is represented by the reference numeral 1, and the truck further comprises a rearwardly extending chassis frame, represented generally by the reference numeral 2. The truck frame 2 comprises rearwardly extending elongated frame members 3, a rear cross member 4 and a front cross member 5. A plurality of rear wheels are carried by the frame 2, and the front set of rear wheels 6 are mounted on a common axle structure 7 driven through the medium of a differential 8, a drive shaft 9 and an auxiliary truck transmission 10 used to further reduce the speed on the truck. The truck auxiliary transmission 10 is driven by a shaft 11 extending rearwardly from the regular truck transmission, not shown. With this arrangement, drive means is provided for imparting generally longitudinally directed movements to the truck and haystack transporting mechanism relative to the ground.

The rear set 12 of rear wheels is mounted on the frame members 3 by means of a common axle 13. It will of course be appreciated that since the particular construction of the truck is not a specific feature of the present invention, further showing and description thereof is omitted. It should also be noted that the present invention may also be utilized in combination with a trailer implement to be pulled by a tractor or other towing vehicle, and the showing and description of the truck is intended to merely illustrate a particular arrangement which has been found satisfactory. Plates in the nature of fenders 26 are secured to the bed frame 15 and disposed above the rear wheels 6, 12.

The present invention comprises a bed assembly, represented generally by the reference numeral 14, which extends generally longitudinally with the truck frame 2. The bed assembly 14 comprises a bed frame 15 which includes side rails 16, a front cross rail 17 and a rear cross rail 18. The box-like bed frame 15 of the bed assembly 14 supports a plurality of laterally spaced generally parallel and longitudinally extending support members 19. The support members 19 are rigidly secured to the bed frame 15, as by welding or the like, not shown.

As shown in FIG. 6, the support members 19 are box-shaped in cross section, but it will of course be appreciated that other suitable designs for the support members 19 may be substituted, such as for example an I-beam or channel iron construction. The bed assembly 14 is secured or mounted to the rear end portion of the truck frame 2 about a generally horizontal transversely extending axis for tilting movements between a horizontal load transporting position, represented by full lines in FIGS. 1 and 4, and an upwardly and forwardly inclined position, represented by dotted lines in FIGS. 1 and 4. The bed assembly 14 is mounted in this manner by means of a pair of laterally spaced depending bearing brackets 20 and a pair of aligned and cooperating upstanding brackets 21 on the frame 2. The bearing brackets 20, 21 are connected by pivot pins 22.

Figure 8:
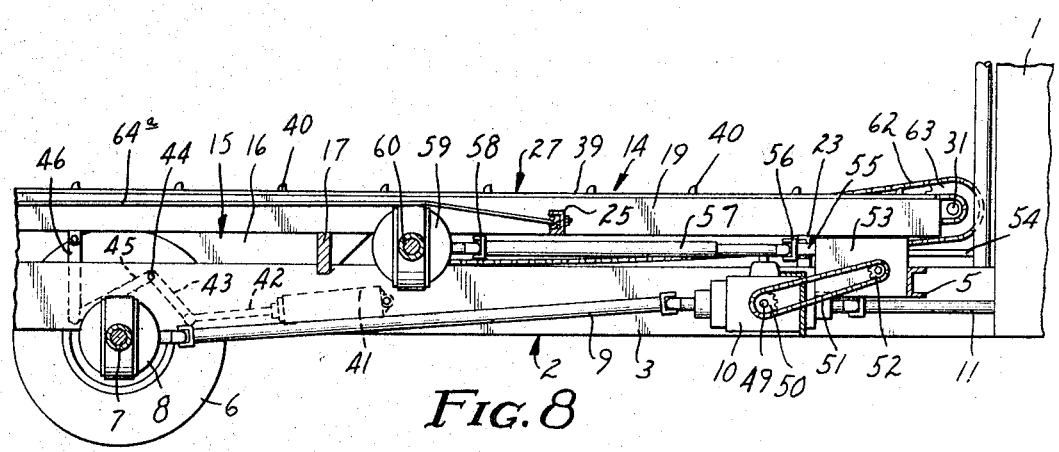
FIG. 8 is an enlarged view in section taken approximately on the line 8—8 of FIG. 2.

In order to strengthen the bed assembly 14, the same further comprises a plurality of cross members 23 and 24. The bed assembly 14 is provided with a plurality of endless conveyor chains 27 each one of which is mounted for movement on a different one of the support members 19 to define an upper flight 28 and a lower flight 29 and with the upper flights 28 being adapted to carry hay onto and off of the bed assembly 14, as will be particularly described hereinafter. As shown particularly in FIGS. 5, 6 and 8, the forward end portions of the conveyor chains 27 are mounted on generally coaxially disposed sprockets 30. The sprockets 30 are secured on a pair of axially spaced and aligned drive shafts 31. The drive shafts 31 are mounted with respect to the end portions of the elongated support members 19 by means of suitable bearing blocks 32.

As shown particularly in FIG. 7, the rear end portions of the conveyor chains 27 are entrained around rear shoes 33 the shafts 34 of which are mounted for generally longitudinally directed adjustable movements with respect to the rear end portions of the support members 19. The opposite end portions of the shoe shafts 34 project through aligned apertures, one of which is shown at 35, in the side walls of the support members 19, and the opposite end portions of the shafts 34 are carried by adjustment bolts 36 which are mounted in projecting ears 37 on the side walls of the support members 19. With this arrangement, the conveyor chains 27 may be adjusted to the desired degree of tension by turning the adjustment nuts 38 on the bolts 36.

The upper flights 28 of the conveyor chains 27 are disposed for movement within guideways defined by laterally spaced guide rods 39 secured to the upper walls of the elongated support members 19, as shown particularly in FIGS. 5–7. The lower return flights 29 of the conveyor chains 27 are disposed within the hollow interiors of the box-like support members 19, as shown particularly in FIG. 6. The conveyor chains 27 as illustrated are of the roller chain type so as to aid in the reduction of friction. However, it will be appreciated that virtually any type of endless flexible conveyor belt or chain may be utilized in accordance with the present invention. The conveyor chains 27 are provided with outwardly extending longitudinally spaced hook-like teeth 40 provided for the purpose of increasing the gripping or grabbing efficiency of the chains 27 with respect to the hay.

Figure 2:
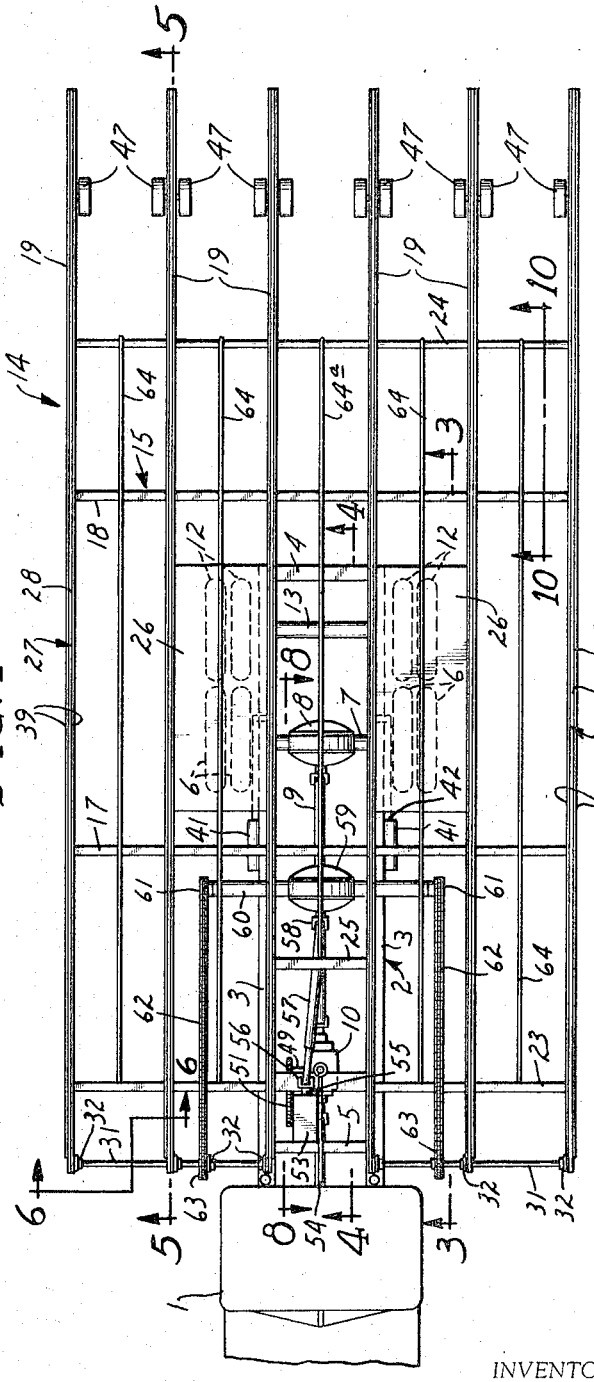
FIG. 2 is a view in top plan with a front portion of the machine being broken away.
Figure 9:
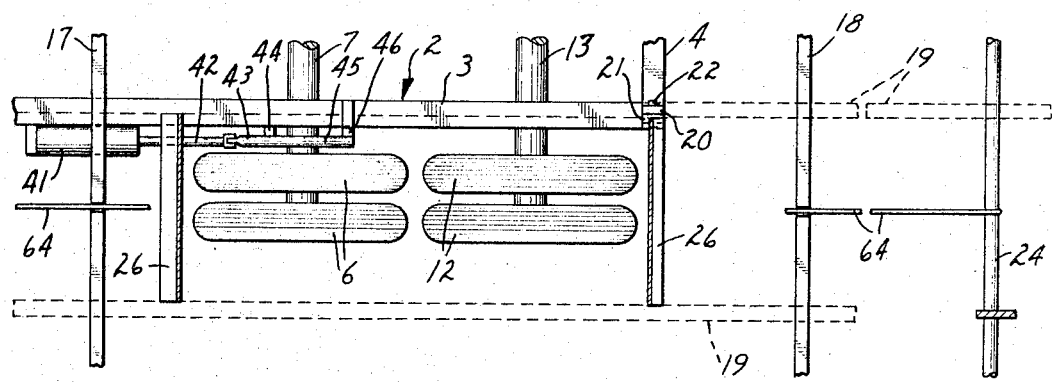
FIG. 9 is a view in horizontal section taken approximately on the line 9—9 of FIG. 3, some parts being broken away.
Figure 11:
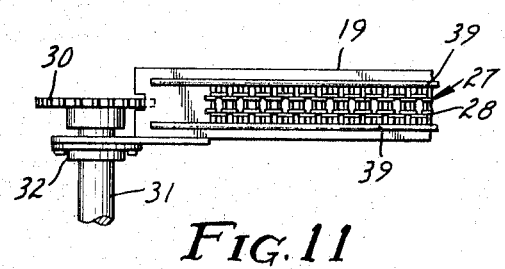
FIG. 11 is an enlarged view in plan showing details of the forward end portion of one of the elongated support members and the conveyor chain carried thereby.
Figure 10:
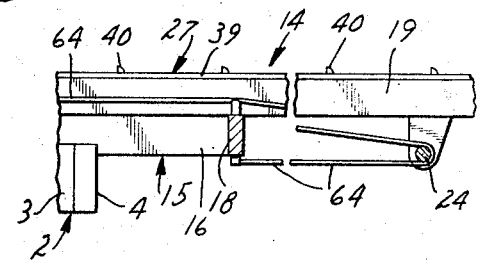
FIG. 10 is an enlarged view in section taken on the line 10—10 of FIG. 2.

Referring particularly to FIGS. 4 and 9, it will be noted that a lifting mechanism is provided for elevating the bed assembly 14 from its horizontal position to its above-described inclined position. Such lift mechanism for each side of the bed assembly 14 comprises a fluid pressure operated cylinder 41, the piston rod 42 of which is pivotally connected to a first crank arm 43 rigidly secured to a rock shaft 44. A second crank arm 45 rigidly secured to the rock shaft 44 in circumferentially spaced relation to the first crank arm 43 is pivotally connected to one end portion of a third crank arm 46, the other end portion of which is also pivotally connected to the bed assembly 14. As specifically shown in FIGS. 3 and 9, the crank arms 43, 45 are formed in a unit on the nature of a bell crank. As shown in FIG. 4, the various positions of the crank arms 43, 45 and 46 corresponding to the horizontal and inclined positions of the bed assembly 14 are illustrated therein. When the bed assembly 14 is in its inclined position shown particularly in FIGS. 1 and 4, the rear end portions of the support members 19 are disposed in close relationship to the ground, and when the machine is backed toward or into a haystack, not shown, the support members 19 are adapted to act as tines moving under the haystack. In order to increase the efficiency with which the support members 19 may move under the haystack and also to provide support for the rear end portions of the support members 19, a plurality of rotary wheels 47 are carried by the rear end portions of the support members 19 for supporting the same when the bed assembly 14 is in its inclined position. As shown particularly in FIG. 7, a pair of the wheels 47 are provided for each of the intermediate support members 19, with the same being pivotally mounted on a common shaft 48 and one each disposed on an opposite side of such support members 19. However, as shown in FIG. 2, the outside support members have only a single wheel 4 on the inner side thereof.

Having noted that means must be provided in accordance with the present invention for moving the conveyor chains in unison on the support members 19, it will be appreciated that various suitable driving arrangements may be provided to accomplish such movement. However, as particularly illustrated in the drawings, the auxiliary truck transmission 10 is provided with a power take-off mechanism within the housing of the transmission 10 and not shown and having a power shaft 49 which has a driven sprocket 50 connected by means of a drive chain 51 to the sprocket 52 of the second transmission mechanism 53, as shown particularly in FIG. 8. The second transmission mechanism 53 is used to regulate the speed of the endless conveyor chains 27. It is also noted that the auxiliary truck transmission 10 is provided with a shift lever 54 for actuating the power shaft 49. The sprocket 52 drives the input shaft of the second transmission 53, and the same is also provided with an output shaft 55 having a universal joint 56 connected to an elongated drive shaft 57. The drive shaft 57 is formed in two telescoping portions so that the same may be elongated when the bed assembly 14 is moved to the tilted position, as shown in FIG. 4. The other end portion of the drive shaft 57 is connected by means of a universal joint 58 to the differential 59 of a rear axle assembly 60. The opposite axle shafts of the rear axle assembly 60 are in turn provided with sprockets 61 on which are entrained endless chains 62 for driving a pair of sprockets 63 each one of which is secured to a different one of the conveyor chain drive shafts 31. It is noted that the sprockets 63 are of a larger diameter than the sprockets 61 on the rear axle assembly 60 so as to provide a further speed reduction. It will be noted that the drive mechanism for the conveyor chains 27 is so connected to the drive means for the truck rear wheels 6 that the upper flights 28 of the conveyor chains 27 will be moving in a direction opposite to the generally longitudinally directed movement of the truck and transport mechanism. For example, when the bed assembly 14 is moved to its tilted position and moved in the direction to proceed under the haystack, the upper flights 28 of the conveyor chains 27 are moving in an opposite forward direction so as to load or lift the haystack onto the bed assembly 14. Conversely, when it is desired to unload the haystack from the transport device of the present invention, and the shift lever 54 is actuated to drive the second transmission mechanism 53 in cooperation with the truck transmission 10, the truck is moved in a forward direction by its driving rear wheels 6 and the upper flights 28 of the conveyor chains 27 are moved in an opposite generally rearward direction so as to unload the haystack onto the ground behind the transport device as the same pulls away from the unloading position. The rate of horizontal movement of the conveyor chains 27 should be generally equal to the rate of truck movement in the opposite direction. Since the chains 27 are inclined when loading and unloading, the specific rate of chain movement may be slightly greater than the rate of truck movement in order to provide generally equal rates of relative movement in horizontal directions.

In order to provide supporting surfaces or members disposed intermediate the spaced elongated support members 19 of the bed assembly 14 for providing additional load bearing surfaces for the haystack, a plurality of cable lengths 64 are connected intermediate the front cross members 23 and rear cross member 24 of the bed assembly 14. The forward end of a center cable 64a is secured to a short cross member 25 of the bed assembly 14, with the rear portion thereof connected to the rear cross member 24. The ends of the cables 64, 64a are returned and secured to the rear cross rail 18. The cable lengths 64 may be secured in any suitable manner, such as by welding, cable clamps or the like. It will also be appreciated that other suitable support stringers may be substituted for the cable lengths 64, such as elongated lengths of lumber or steel bars of various configurations.

Having the above description of the present invention in mind, it will be appreciated that important features thereof reside in the provision of means whereby the bed assembly 14 is tilted and moved in a direction to proceed under the haystack whereas the load supporting surfaces of the bed assembly 14 are moved in an opposite direction to load the stack onto the bed assembly 14, the stack being in effect elevated onto the bed assembly 14 without any appreciable horizontal movement or disarrangement of the stack. This cooperation of movements in opposite directions, along with the provision of the rotary supporting wheels 47 at the rear end portions of the support members 19, provide an extremely efficient assembly for overcoming the normal loading resistance encountered when attempting to move the bulky haystacks.

This invention has been tested and found to be completely satisfactory for the accomplishment of the previously noted objects; and while a preferred embodiment, in which the principles of the present invention have been incorporated, has been shown and described herein, it should be specifically understood that the same may be modified without departure from the scope and spirit of the appended claims.

What is claimed is:

1. A mobile machine for transporting haystacks and comprising:
   (a) an elongated frame,
   (b) drive means for imparting generally longitudinally directed movements to said machine relative to the ground,
   (c) an elongated bed assembly extending longitudinally of said frame,
   (d) means mounting said bed assembly on said frame for tilting movements between an inclined position, wherein the bed assembly is adapted for movement with said machine and under a haystack for loading and unloading of a haystack onto said bed assembly, and a horizontal load transporting position,
   (e) said bed assembly including a plurality of laterally relatively widely spaced longitudinally extending support members each having a transversely relatively narrow top supporting surface,
   (f) a plurality of endless conveyor chains each one mounted for conveying movement on a different one of said support members to define upper and lower flights and with the upper flights each being supported on its respective supporting surface and adapted to carry hay onto and off of said bed assembly as the bed assembly is moved under a stack, and
   (g) second drive means connected to said first drive means and operative to impart concerted movement to the upper flights of said conveyor chains in a direction opposite to the direction of the generally longitudinal movement imparted to said machine by said first drive means and also at a rate greater than said machine movement, whereby the haystack is moved as a unit onto the tilted bed.

2. A mobile machine for transporting haystacks and comprising:
   (a) an elongated frame,
   (b) drive means for imparting generally longitudinally directed movements to said machine relative to the ground,
   (c) an elongated bed assembly extending longitudinally with said frame,
   (d) means mounting said bed assembly on said frame about a generally horizontal transversely extending axis for tilting movements between a horizontal load transporting position and an upwardly and forwardly inclined position wherein the rear end portion of said bed assembly is disposed close to the ground for loading and unloading of a haystack onto said bed assembly and wherein the bed assembly is adapted for movement with the frame and under a haystack,
   (e) means for tilting said bed assembly between its said horizontal position and its inclined position,
   (f) said bed assembly including a plurality of laterally relatively widely spaced longitudinally extending support members each having a transversely relatively narrow top supporting surface.
   (g) a plurality of endless conveyor chains each one mounted for conveying movement on a different one of the support members to define upper and lower flights and with the upper flights each being supported on its respective top supporting surface and adapted to carry hay onto and off of said bed assembly as the bed assembly is moved under a stack, and
   (h) second drive means connected to said first drive means and operative to impart concerted movements to the upper flights of said conveyor chains in a direction opposite to the direction of the generally longitudinal movement imparted to said machine by said first drive means and also at a rate greater than said machine movement, whereby the haystack is moved as a unit onto the tilted bed.

3. The structure defined in claim 2 in further combination with a plurality of rotary wheels carried by the rear end portion of said bed assembly for supporting the same when in its said inclined position.

4. The structure defined in claim 3 in which said conveyor chains include rollers engaging the associated support members to reduce the power requirements for driving said chains.

5. A mobile machine for transporting haystacks and comprising:
   (a) an elongated frame,
   (b) drive means and transmission mechanism for imparting generally longitudinally directed movements to said machine relative to the ground,
   (c) an elongated bed assembly extending longitudinally with said frame,
   (d) means mounting said bed assembly on said frame for tilting movements between a horizontal load transporting position and an inclined position for loading and unloading of a haystack onto said bed assembly and wherein the bed assembly is adapted for movement with the frame and under a haystack,
   (e) said bed assembly including a plurality of laterally relatively widely spaced longitudinally extending support members each having a transversely relatively narrow top supporting surface,
   (f) a plurality of endless conveyor chains each one mounted for conveying movements on a different one of said support members to define upper and lower flights and with the upper flights each being supported on its respective top supporting surface and adapted to carry hay onto and off of said bed assembly as the bed assembly is moved under a haystack, said endless chains being operatively coupled to a common drive shaft, and (g) second drive means connected to said first drive means and operative to impart concerted movement to the upper flights of said conveyor chains in a direction opposite to the direction of generally longitudinal movement imparted to said machine by said first drive means and also at a rate greater than said machine movement whereby the haystack is moved as a unit onto the tilted bed, said second drive means comprising:

(1) a power takeoff from said transmission mechanism of said first drive means, and (2) a second transmission mechanism connected to said power takeoff and driven thereby and further connected to said common drive shaft of the conveyor chains.

6. The structure defined in claim 1 in which each of said support members defines a passage extending longitudinally thereof, the lower flight of each conveyor chain being disposed longitudinally within the passage of its respective support member.

7. The structure defined in claim 1 in which said bed assembly includes a plurality of elongated narrow support elements each extending longitudinally of said bed assembly between adjacent ones of said support members, said support elements being disposed adjacent the horizontal plane of the top surfaces of said support members and cooperating therewith and said upper conveyor chain flights to provide the sole hay-engaging portions of said machine.

8. A mobile machine for transporting haystacks and comprising:

(a) an elongated frame, (b) drive means for imparting generally longitudinally directed movement to said machine relative to the ground, (c) an elongated bed assembly extending longitudinally of said frame, (d) means mounting said bed assembly on said frame for tilting movements between an inclined position wherein the bed assembly is adapted for movement with said machine and under a haystack for loading and unloading of a haystack onto said bed assembly, and a horizontal load transporting position, (e) said bed assembly including a plurality of laterally spaced longitudinally extending support members, (f) a plurality of laterally spaced endless conveyor elements one each mounted on a different one of at least some of said support members each having upper and lower flights, the upper flights overlying their respective support members and being adapted to carry hay onto and off of said bed assembly as it is moved under a stack, (g) a plurality of longitudinally spaced hay-engaging teeth on each of said conveyor elements, (h) and second drive means operative to impart concerted movement to the upper flights of said conveyor elements in a direction opposite to the direction imparted to said machine by said first-mentioned drive means and at a rate to move the hay carried thereby at a speed greater than the machine movement imparted by the first mentioned drive means.

9. A mobile machine for transporting haystacks according to claim 1 in further combination with a plurality of longitudinally spaced hay-engaging teeth on each of said conveyor elements.

10. A mobile machine for transporting haystacks and comprising:

(a) an elongated frame, (b) drive means for imparting generally longitudinally directed movement to said machine relative to the ground, (c) an elongated bed assembly extending longitudinally of said frame, (d) means mounting said bed assembly on said frame for tilting movements between an inclined position wherein the bed assembly is adapted for movement with said machine and under a haystack for loading and unloading of a haystack onto said bed assembly, and a horizontal load transporting position, (e) said bed assembly including a plurality of laterally spaced longitudinally extending support members, (f) a plurality of laterally spaced endless conveyor elements one each mounted on a different one of at least some of said support members, and each having upper and lower flights, the upper flights overlying their respective support members and being adapted to carry hay onto and off of said bed assembly as it is moved under a stack, (g) a plurality of longitudinally spaced hay-engaging teeth on each of said conveyor elements, (h) and second drive means operative to impart concerted movement to the inclined upper flights of said conveyor elements in a direction opposite to the direction imparted to said machine by said first-mentioned drive means and at a rate on the incline such that said flights have a horizontal component of movement generally equal to the rate of machine movement.

11. The mobile machine defined in claim 10 in which said bed assembly includes a bed frame, said support members having upper surfaces disposed in a plane in overlying spaced relation to said bed frame, said upper flights of the conveyor elements being supported by said top surfaces of the support members.

References Cited by the Examiner

UNITED STATES PATENTS 3,209,932  10/1965  Schiltz _____ 214—508 X

GERALD M. FORLENZA, *Primary Examiner.*

A. J. MAKAY, *Assistant Examiner.*